Figure 1:
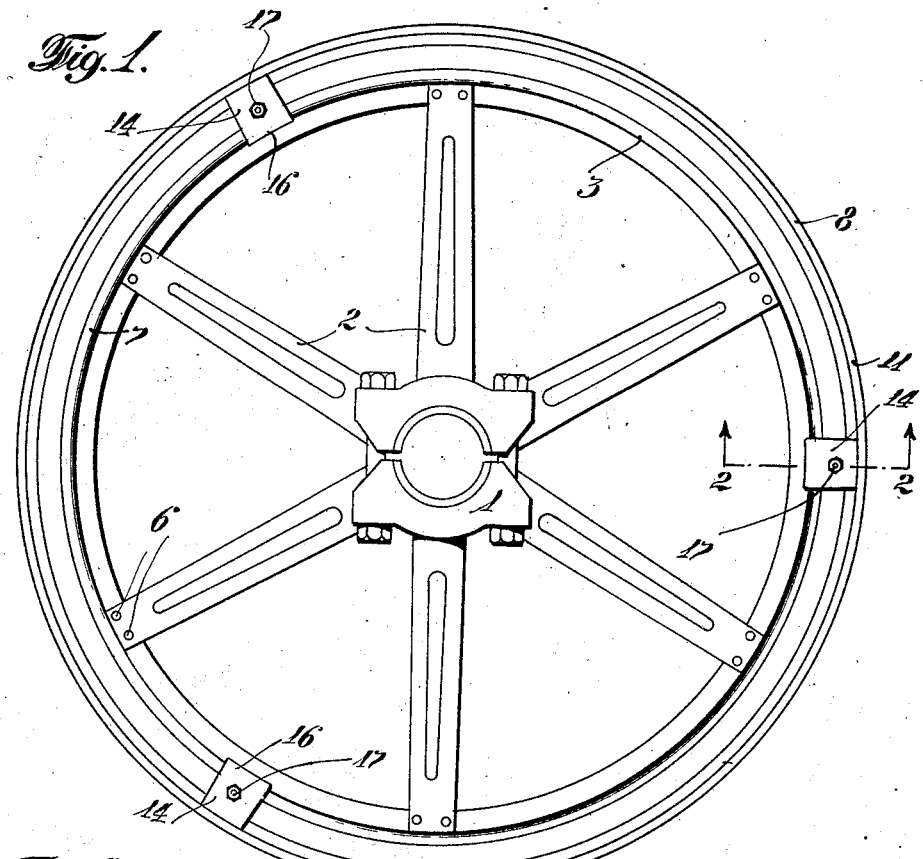

Dec. 15, 1925.  1,565,469
F. P. KOBERT
SUPPLEMENTAL RIM FOR POWER PULLEYS OR BELT WHEELS
Original Filed Feb. 28, 1919

INVENTOR
Frank P. Kobert
BY his ATTORNEY
Edward M. Evarts

Patented Dec. 15, 1925.

1,565,469

UNITED STATES PATENT OFFICE.

FRANK P. KOBERT, OF WORCESTER, MASSACHUSETTS, ASSIGNOR TO KOBERT SUPPLE-MENTARY PULLEY RIM CO., A CORPORATION OF MASSACHUSETTS.

SUPPLEMENTAL RIM FOR POWER PULLEYS OR BELT WHEELS.

Substitution for application Serial No. 279,676, filed February 28, 1919. Renewed May 26, 1921, Serial No. 470,204. This application filed February 6, 1922, Serial No. 534,569. Renewed February 23, 1924.

*To all whom it may concern:*

Be it known that I, FRANK P. KOBERT, a citizen of the United States, and residing at Worcester, in the county of Worcester and State of Massachusetts, have invented certain new and useful Improvements in Supplemental Rims for Power Pulleys or Belt Wheels, of which the following is a specification, such as will enable those skilled in the art to which it appertains to make and use the same.

The object of this invention in power pulleys or belt wheels is to provide a supplemental rim for pulleys or wheels of this class by means of which the diameter of such pulleys or wheels may be increased whenever desired in order to take up the slack in a belt or for any other purpose.

The invention described and claimed herein is an improvement on that covered by U. S. Letters Patent No. 1,062,831 granted to me May 27, 1913, and is fully disclosed in the following specification, of which the accompanying drawing forms a part, in which the separate parts of my improvement are designated by suitable reference characters in each of the views, and in which Fig. 1 is a side view of what is known as a made-up steel pulley provided with my improvement; and, Fig. 2 a partial section thereof on the line 2—2 of Fig. 1.

In the drawing forming part of this specification I have shown an ordinary made-up steel pulley comprising a hub 1, spokes 2 and a rim 3, said rim being composed of two parts, the adjacent edges of which are provided with inwardly directed flanges 4 to which the separate parts 5 of the spokes 2 are secured by bolting, riveting or otherwise as shown at 6, and in the construction shown the rim 3 is provided at its outer edges with inwardly folding beads 7.

In the practice of my invention, I provide a suplemental rim 8 which is made in the same manner as the rim 3, said rim 8 being composed of two parts 8 and 9, the adjacent edges of which are provided with inwardly directed flanges 10, which are bolted or riveted together and the outer edges of said parts are provided, in the construction shown, with inwardly folded beads 11.

Figure 2:
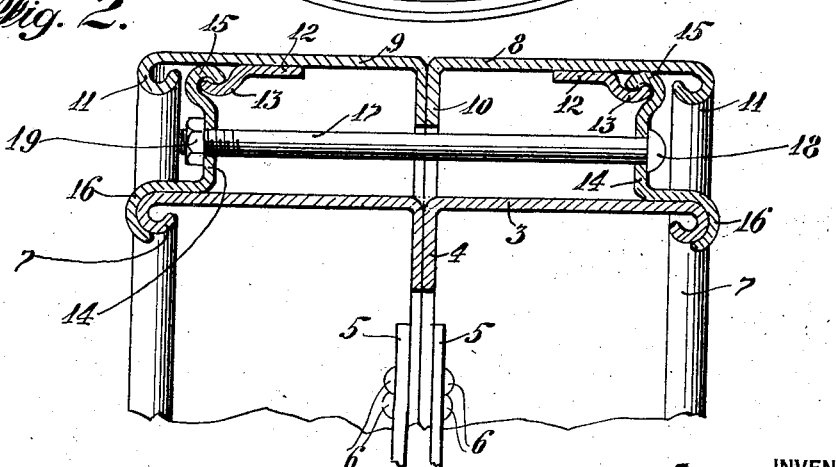

Secured to the inner sides of the parts 8 and 9 of the supplemental rim 8 by welding or otherwise are hook members 12, having outwardly directed hooks 13, and I also provide hook link members 14, three of which are shown in Fig. 1 but any desired number of which may be employed, and these hook link members are provided at their outer ends with hooks 15 adapted to engage the hooks 13 of the hook members 12 and at their inner ends with hooks 16 adapted to engage the outer edge portions of the main rim 3 of the pulley, or wheel.

The hook link members 14 are arranged in pairs transversely of the wheel and are adapted to be connected by bolts 17 provided at one end with a head 18 and at the opposite end with a nut 19.

It will be understood that the supplemental rim or rims 8 may be made of any desired size, and in connecting a supplemental rim in this way with the main rim of a pulley or drive wheel, the desired size of a supplemental rim is first selected, and placed in position around the pulley or wheel, after which the hook link members 14, made also of any desired size and length are placed in position by engaging the hook end 16 thereof with the outer edges of the rim of the main pulley or wheel, and then sliding the hook members 15 into engagement with the hook members 13, after which the bolts 17 are passed transversely through oppositely arranged hook members 14 and the nuts 19 are employed to securely bind the hook members 14 in position and to clamp the supplemental rim member 8 in connection with the main rim member 3 of the pulley or wheel.

As hereinbefore stated, the supplemental rim members of any desired size may be made up and kept in stock as may also the hook link members 14 and bolts 17, and whenever it is desired to enlarge a pulley or drive wheel the desired supplemental rim member is selected and the parts are assembled as shown and described.

Although I have described the main rim 3 of the pulley or wheel as composed of sheet steel and the supplemental rim 8 as also composed of sheet steel and the separate parts thereof provided at their outer edges with beads, my invention is not limited to such details of construction, and said parts may be formed or constructed in any desired way, and of any preferred material, and various changes in and modifications of the construction herein described may be made, within the scope of the appended claims, without departing from the spirit of my invention or sacrificing its advantages, and while I have shown and described the hook members 12 and link members 14 as arranged in pairs transversely of the wheel, this is not absolutely essential and said parts may be put in staggered or other relations, if desired.

The present application is a substitution, in identical form and substance, for my previously filed application, Serial No. 279,676, filed February 28, 1919, and renewed May 26, 1921, as an application bearing Serial No. 470,204, and entitled "Supplemental rim for power pulleys or belt wheels".

Having fully described my invention, what I claim as new and desire to secure by Letters Patent, is:—

1. A supplemental rim for use in connection with a pulley or power wheel in order to enlarge the same, said supplemental rim being provided on its inner side with outwardly directed hook members arranged in pairs transversely thereof, and means for connecting the said supplemental rim with the main rim of the pulley or wheel consisting of hook link members also adapted to be arranged in transverse pairs and provided at one end with hooks adapted to engage the hook members on the inner side of the supplemental rim and at the other end with hooks adapted to engage the opposite edges of the main rim of the pulley or wheel, and bolts adapted to be passed transversely through the oppositely arranged hook link members.

2. The herein described means for enlarging a pulley or belt wheel comprising a supplemental rim provided on its inner side with oppositely arranged hook members and devices adapted to engage said hook members and the outer edges of the main rim of the pulley or belt wheel.

3. The combination with a pulley or belt wheel, of a supplemental rim designed to enlarge said pulley or wheel, said supplemental rim being provided on its inner side with oppositely arranged hook members, and devices adapted to engage said hook members and the outer edges of the main rim of the pulley or wheel to secure said supplemental rim and the main rim together.

4. The combination with a pulley or belt wheel, of a supplemental rim adapted to enclose and enlarge the pulley or belt wheel, said supplemental rim being provided on its inner side with oppositely arranged hook members, hook devices adapted to engage said hook members and the outer edges of the main rim of the pulley or wheel, and bolts passed through oppositely arranged hook devices transversely of the pulley or wheel and adapted to bind said hook devices together and secure the supplemental rim to the main rim of the pulley or wheel.

5. The herein described means for enlarging a pulley or belt wheel, comprising a supplemental rim provided on its inner side with hook members, and devices adapted to engage said hook members and the outer edges of the main rim of the pulley or belt wheel to secure the supplemental rim in position.

6. The herein described means for enlarging a pulley or belt wheel comprising a supplemental rim of greater diameter than the rim of the pulley or wheel and provided on its inner side with attaching devices, independent locking devices provided at both ends with hook members, the hook members of one end being adapted to engage said attaching devices and those at the other end to engage the main rim of the pulley or wheel, and means for securing said independent locking devices in operative position.

In testimony whereof, I have signed my name to this specification this 28th day of January, 1922.

FRANK P. KOBERT.